United States Patent [19]

Oshnock

[11] Patent Number: 5,040,932
[45] Date of Patent: Aug. 20, 1991

[54] LOCATOR MECHANISM FOR A TOOL HOLDER ASSEMBLY

[75] Inventor: Robert E. Oshnock, Apex, N.C.
[73] Assignee: Kennametal Inc., Latrobe, Pa.
[21] Appl. No.: 445,568
[22] Filed: Dec. 4, 1989
[51] Int. Cl.⁵ ............................................... B23C 5/26
[52] U.S. Cl. ............................... 409/234; 408/239 R; 279/83; 279/75; 82/158
[58] Field of Search ............... 409/234; 408/231-233, 408/239 R, 239 A, 240, 181, 143; 279/83, 1 TE, 75, 5; 82/158-161; 74/813 L; 403/362

[56] References Cited

U.S. PATENT DOCUMENTS

| | | |
|---|---|---|
| 1,596,708 | 8/1926 | Bellows . |
| 1,958,817 | 5/1934 | Gase . |
| 2,534,432 | 12/1950 | Frushour ........................ 74/813 L |
| 2,873,822 | 2/1959 | Sloan ........................ 74/813 L X |
| 3,586,344 | 6/1971 | Nixon ........................ 279/83 |
| 3,776,656 | 12/1973 | Benjamin ........................ 408/233 |
| 3,877,832 | 4/1975 | Benjamin ........................ 408/238 |
| 4,063,843 | 12/1977 | Barkley et al. ........................ 408/226 |
| 4,575,292 | 3/1986 | Pape et al. ........................ 409/234 |
| 4,647,052 | 3/1987 | Butikofer ........................ 279/83 |
| 4,813,831 | 3/1989 | Reinauer ........................ 409/232 |

FOREIGN PATENT DOCUMENTS

| | | | |
|---|---|---|---|
| 3019970 | 12/1981 | Fed. Rep. of Germany ...... | 409/234 |
| 290972 | 8/1953 | Switzerland ........................ | 279/83 |
| 924885 | 8/1961 | United Kingdom ............ | 408/239 R |

Primary Examiner—Larry I. Schwartz
Assistant Examiner—Robert Schultz
Attorney, Agent, or Firm—Thomas R. Trempus

[57] ABSTRACT

A tool holder assembly includes a first member formed with a cylindrical bore and a second member including a cylindrical portion receivable in the bore of the first member. A locator screw hole extends radially through the first member. The second member is formed with a conical face having a centerline perpendicular to its longitudinal centerline. A locator screw is threaded into the locator screw hole in the first member. The locator screw includes a conical nose adapted to engage the conical face of the second member when the locator screw is turned in a first direction. The locator screw cooperates with the conical face of the second member to radially locate the second member with respect to the first member.

7 Claims, 3 Drawing Sheets

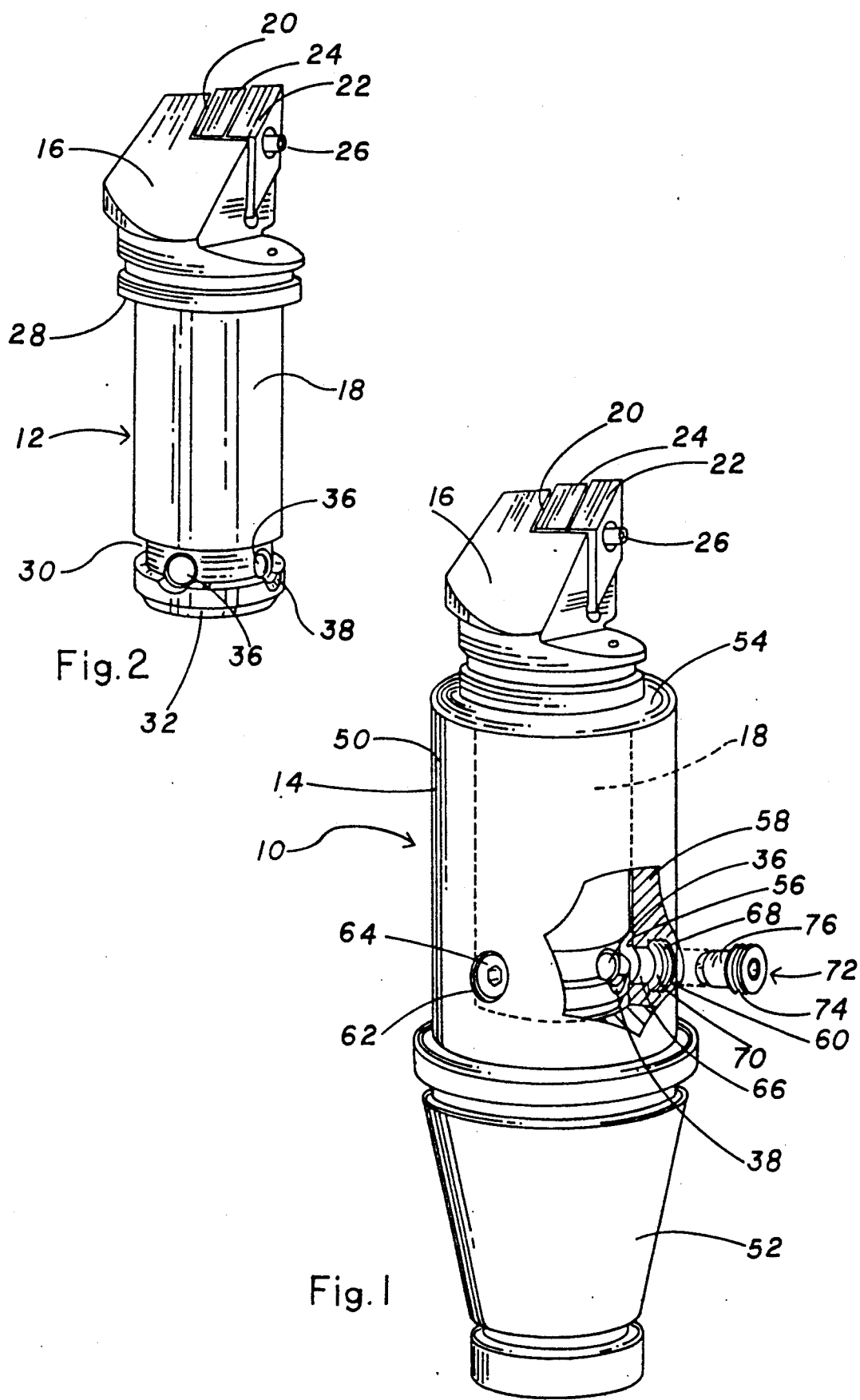

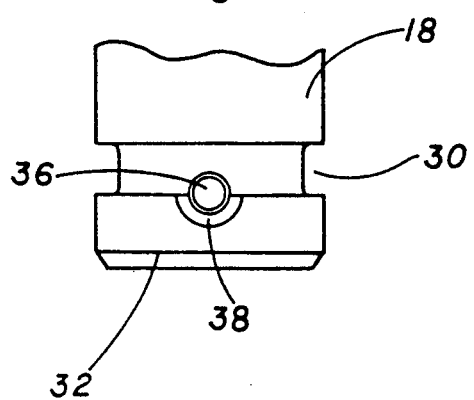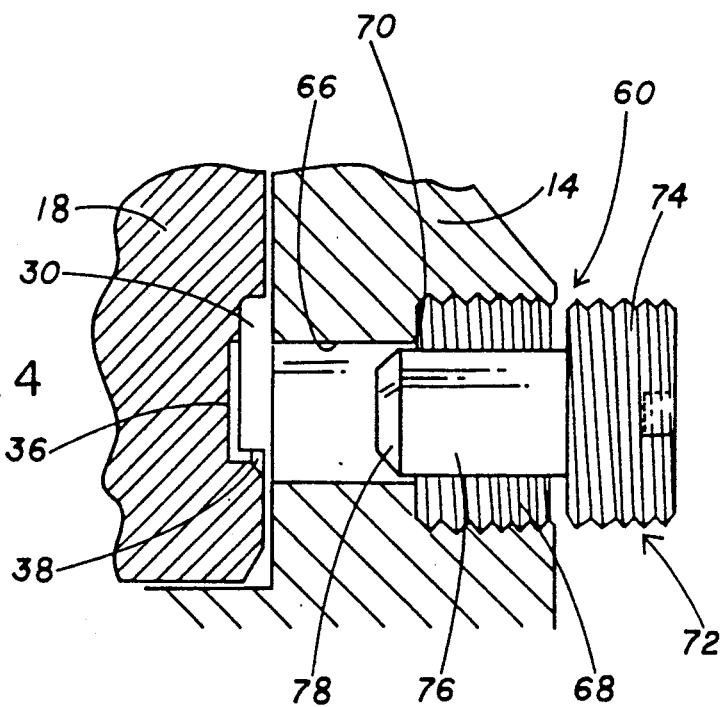

LOCATOR MECHANISM FOR A TOOL HOLDER ASSEMBLY

FIELD OF THE INVENTION

The present invention relates generally to a tool holder assembly and more particularly to a means for angularly locating and axially locking the position of the tool holder with respect to a tool support member.

BACKGROUND OF THE INVENTION

Tool holders are known which include long cylindrical or tapered shanks which insert into an axial bore of a tool support member. The tool holder is typically secured by means of a set screw which screws into engagement with the tool shank. The set screw sometimes includes a bevelled or faceted end which engages with an inclined surface on the shank of the tool holder so that when the screw is tightened, the tool holder is pulled rearwardly against the support member.

One problem associated with these types of tool holders is that they do not give repetitive and accurate angular location between the support member and tool holder. In the past, tool holders have been located by providing a keyway in either the tool shank or the tool shank bore which cooperates with key element in the other member. Another method which has been tried is to provide one or more flat surfaces on the tool shank which are engaged by the ends of the set screw. In each of the above cases, the accuracy and repeatability of the radial location between the two parts is not as desired.

SUMMARY AND OBJECTS OF THE INVENTION

The present invention provides a mechanism that will provide accurate and repeatable angular location between a tool holder or internal mechanism and tool support member. In addition, the present invention will produce an axial force to lock the tool holder or other tool part against the tool support member.

In one embodiment, the present invention includes a tool support member which terminates in an end face. An axial bore extends rearwardly from the end face of the support member. The wall of the support member surrounding the axial bore is formed with a locator screw hole that extends normal to the axis of the tool holder. A locator screw is threaded into the locator screw hole and includes a conical nose.

The tool holder includes a forward portion formed with a tool receiving pocket, and a shank extending rearwardly from the forward portion. The shank is formed with a forwardly facing conical abutment surface which forms of a cone segment of not more than 180°. The axis of the conical abutment surface is perpendicular to the axis of the tool holder and aligns with the axis of the locator screw hole in the support member. The conical abutment surface cooperates with the conical nose section of the locator screw to firmly lock the tool holder against the support member when the locator screw is tightened. Additionally, because the size and angle of the conical nose section corresponds to the conical abutment surface in the shank, these elements also cooperate to radially locate the tool holder with respect to the support member.

In the preferred embodiment of the invention, the locator screw hole includes a non-threaded portion. The locator screw includes a guide member which fits snugly in the non-threaded portion of the locator screw hole. The hole and the guide member cooperate to remove slop caused by thread pitch misalignment assuring repetitive and accurate angular location between the tool holder and support member.

A second embodiment of the invention employs the angular locator in connection with an internal clamping mechanism. The internal mechanism includes a generally cylindrical stub member. The stub member is also formed with a forwardly facing, conical abutment surface. The conical abutment surface of the stub member is engaged by a locator screw as in the first embodiment, to angularly locate the stub member with respect to the support member.

Additional embodiments of the invention will become readily apparent. For instance, the invention may be used to secure an end mill in an end mill holder. These additional embodiments are also embraced within the claims.

Accordingly, it is a primary object of the present invention to provide a mechanism for securing a tool holder or other tool part to a support member which gives repetitive and accurate angular location between the two parts.

Another object of the present invention is to provide a mechanism for securing a tool holder or other tool part to a support member which provides positive axial locking between the two parts.

Another object of the present invention is to provide a tool holder assembly which allows rapid interchange of one tool holder for another.

Other objects and advantages of the present invention will become apparent and obvious from a study of the following description and the accompanying drawings which are merely illustrative of such invention.

BRIEF DESCRIPTION OF THE INVENTION

FIG. 1 is a perspective view of the tool holder assembly of the present invention with a fragment removed to illustrate the locator screw.

FIG. 2 is a perspective view of the tool holder used in connection with the first embodiment.

FIG. 3 is an elevation of the rear end of the tool holder of the first embodiment;

FIG. 4 is a section view of the first embodiment;

DETAILED DESCRIPTION OF THE INVENTION

Figure 7:
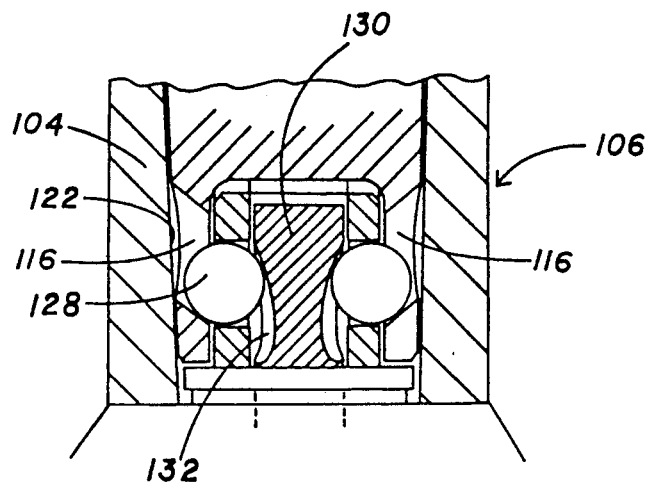
FIG. 7 is a partial section view of the tool holder assembly of the second embodiment.
Figure 6:
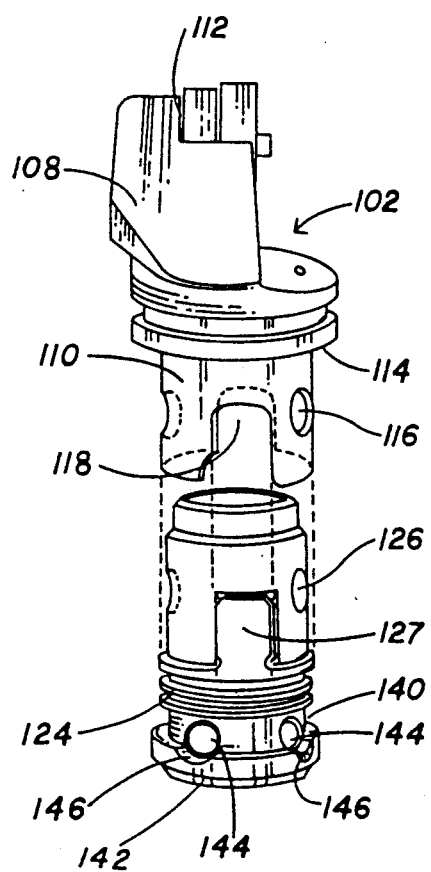
FIG. 6 is a perspective view of the tool holder and stub member used in connection with the second embodiment.
Figure 5:
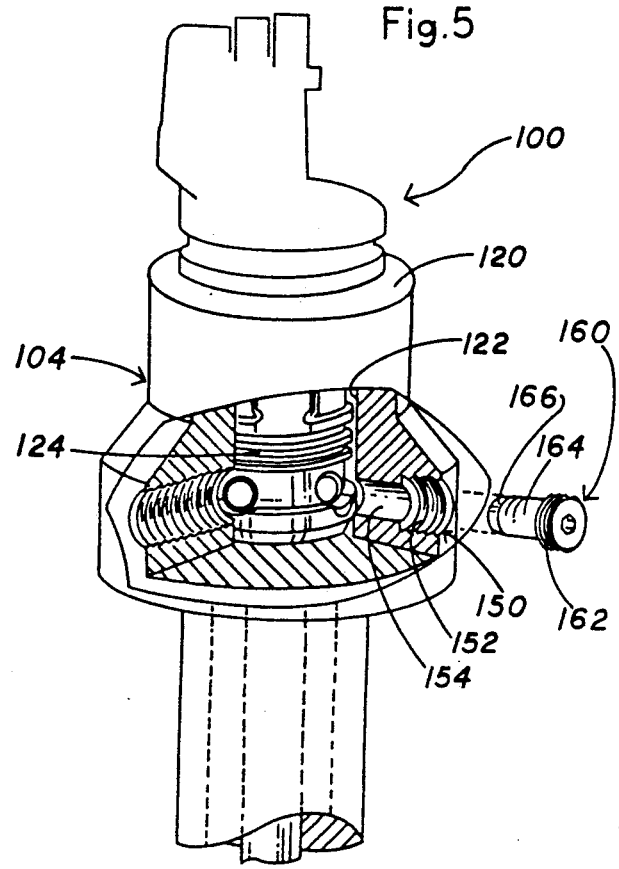
FIG. 5 is a perspective view of a second embodiment of the invention with a fragment of the support member removed to illustrate the invention.

Referring now to the drawings, the tool holder assembly 10 of the present invention is shown. In its simplest form, the tool holder assembly 10 includes a tool holder 12 and a support member 14. In the illustrated embodiment, the tool holder 12 comprises a boring bar, although the present invention is not limited thereto. For instance, the present invention may be utilized to secure a part of an internal clamping mechanism as shown in FIGS. 5-7, or to secure an end mill in its holder.

Referring back to the embodiment shown in FIGS. 1 through 4, the tool holder 12 includes a forward portion 16 and a rearwardly extending shank 18. The forward portion 16 is formed with a pocket 20 adapted to receive a cutting tool. The pocket 20 is conventional in design and is adapted to receive an indexable cutting insert 22, shim 24, and locking pin 26.

The shank 18 extends rearwardly from the forward portion 16. A rearwardly facing shoulder 28 is formed at the juncture of the forward portion 16 and shank 18. Preferably, the rearwardly facing shoulder is planar and is oriented at 90° to the longitudinal centerline of the shank 18.

An annular recess 30 is formed in the shank 18 adjacent a rear end portion 32. The annular recess 30 extends circumferentially around the shank 18. It is appreciated that the annular recess 30 can be substituted by a recessed pocket without departing from the spirit and essential characteristics of the invention.

A hole 36 is drilled in the shank 18 which lies partly within the annular recess 30 and partly on the rear end portion 32 as best seen in FIG. 3. The axis of the hole 36 is normal to the longitudinal centerline of the tool holder 12. It is preferred that slightly more than one-half of the hole 36 lies in the annular recess 30 as best shown in FIG. 4. In other words, the centerline of the hole 36 lies within the annular recess 30 closely adjacent the rear wall thereof.

The portion of the hole 36 lying on the rear end portion of the shank 18 is countersunk so as to form a forwardly-facing, conical abutment surface 38. The conical abutment surface 38 forms an angle of approximately 60° with respect to the centerline of the hole 36. Also, since the centerline of the hole 36 lies within the annular recess 30, the abutment surface 38 forms a cone segment of slightly less than 180°. The centerline of the hole 36 and conical abutment surface 38 are on the same centers.

The support member 14 includes a forward portion 50 and a tapered rear portion 52. The rear portion 52 is adapted to insert into a conical pocket of a machine spindle (not shown). The forward portion 50 includes an end face 54. A tool shank bore 56 extends axially from the end face 54 towards the rear portion 52. The tool shank bore 56 is of the same dimension as the tool shank 18 of the tool holder 12 to provide a close fit between the two parts.

Within the wall structure 58 surrounding the bore 56 is formed a locator screw hole 60. As shown in FIG. 4, the locator screw hole 60 includes a non-threaded portion 66 and a threaded portion 68. See FIG. 4. The threaded portion 68 is larger in diameter than the non-threaded portion 66 so as to define a shoulder 70 between the larger and smaller diameters.

Means are provided for axially locating the tool holder 12 with respect to the support member 14. The axial locating means in this embodiment comprises the rearwardly facing shoulder 28 of the tool holder which butts against the end face 54 of the support member 14. When the tool holder 12 is located axially, the centerlines of the conical abutment surface 38 and locator screw hole 60 should preferably lie in the same axial plane.

A locator screw 72 is threaded into the locator screw hole 60 for securing the tool holder 12 within the support member 14. The locator screw 72 includes a threaded portion 74 adapted to engage with the threaded portion 68 of the locator screw hole 60 and a non-threaded guide portion 76. The guide portion 76 is so sized as to fit snugly within the non-threaded portion 66 of the locator screw hole 60. Thus, guide portion 76 of the locator screw 72 acts as a pilot during assembly and removes slop between the locator screw hole 60 and locator screw 72 caused by thread pitch misalignment.

The guide portion 76 of the locator screw 72 terminates in a conical nose 78. The angle of the conical nose 78 corresponds to the angle of the conical abutment surface 38 of the tool holder 12. Further, the radius of the conical nose 78 at its widest and smallest points is the same as the radius of the conical abutment surface 38. Because the conical nose piece 78 is so sized and dimensioned, it will engage fully with the abutment surface 38 in the tool holder 12. Thus, when the screw 72 is tightened against the tool holder 12, the tool holder 12 will rotate until the centerline of the conical abutment surface 38 aligns with the centerline of the locator screw 72. Thus, the cooperation of the adjusting screw 72 with the conical abutment surface 38 in the tool holder 12 makes the tool holder 12 self-centering and assures repetitive and accurate angular location between the tool holder 12 and support member 14. In addition the locator screw 72 cooperates with the abutment surface 38 to lock rearwardly facing shoulder 28 of the tool holder against the end face 54 of the support member 14.

The single locator screw 72 provides accurate angular location. However, one or more conventional set screws 64 maybe provided which extend through set screw holes 62 in the support member 14. The set screws 64 do not provide angular location, but rather, provide more positive axial location.

Referring now to FIGS. 5 through 7, a second embodiment of the present invention is shown and indicated generally by the numeral 100. The second embodiment of the invention employs the angular locator to secure a part of an internal clamping mechanism 106 within the axial bore of a support member 104. The angular locator assures accurate angular location between the clamping mechanism 106 and the support member 102.

The second embodiment includes a tool holder 102, support member 104 and internal clamping mechanism 106. The tool holder 102 includes a forward portion 108 and a tapered shank portion 110. As in the first embodiment, the forward portion 108 is formed with a pocket 112 adapted to receive a cutting tool.

The tapered shank 110 extends rearwardly from the forward portion 108. A rearwardly facing shoulder 114 is formed at the juncture of the shank with the forward portion 108. The shoulder 114 is adapted to engage the end face 120 of the support member 104. Preferably, the shoulder 114 is planar and is oriented 90° to the longitudinal centerline of the shank 110.

The tubular shank 110 has a frusto-conical shape. A pair diametrically opposed apertures 116 are formed in the wall of the tubular shank 110 which extend from the inner surface thereof to the outer surface. Two diametrically opposed slots 118 extend from the rear end of the tubular shank and serve as keyways. The slots 118 accept keys 127 formed on a stub member 124 to hold the tool holder non-rotatable with respect to the stub member 124. This type of tool holder is disclosed more fully in the patent to Erikson, U.S. Pat. No. 4,723,877, which disclosure is incorporated herein by reference.

The support member 102 includes an end face 120. Tapered bore 122, which is adapted to receive the tapered shank 110 of the tool holder 102, extends axially from the end face 120. The clamping mechanism 106 is contained within the bore 122 and butts against the bottom thereof.

The clamping mechanism 106 includes a hollow stub member 124 having diametrically opposed apertures 126. Between the apertures 126 are raised portions 127 which serve as keys. The raised portions 127 insert into the slots 118 of the tubular shank to prevent relative rotation between the stub member 124 and the tool holder 112.

Two spherical balls 128 are contained within the stub member 124. (See FIG. 7) The balls 128 are urged outwardly through the apertures 126 by a locking rod 130. The locking rod 130 is formed with ball driving ramps 132 which drive the balls 128 outwardly when the locking rod 130 is pulled rearwardly. As the locking balls 128 are driven outwardly by ramps 132, they are driven into abutment with the walls of the apertures 116 in the tool holder shank 110 as best seen in FIG. 7. In this manner, a rearward force is directed against the tool holder 10 such that the rearwardly facing shoulder 114 is pulled against the end face 120 of the support member 104.

The angular location of the tool holder 102 in the second embodiment is dependant upon the angular location between the stub member 124 and support member 104. Thus, the second embodiment incorporates the angular locator into the stub member 124.

An annular recess 140 extends circumferentially around the rear end 142 of the stub member 124. As in the first embodiment, a hole 144 having a centerline perpendicular to the longitudinal centerline of the stub member 124 is formed in the stub member 124. The hole 144 lies partly within the annular recess 140 and partly on the rear end portion 142. The portion lying on the rear end is countersunk to form a conical abutment surface 146.

As in the first embodiment, the support member 104 includes a locator screw hole 150 extending through the wall surrounding the bore 122. In this embodiment, accurate axial location is provided by butting the rear end portion 142 of the stub member against the bottom of the axial bore 122. Thus, the centerline of both the locator screw hole 150 and conical abutment surface 146 lie in the same axial plane.

The locator screw hole 150, as in the first embodiment, includes threaded and non-threaded portions 152 and 154. Similarly, the locator screw 160 includes a non-threaded portion 164 and a threaded portion 162. The non-threaded portion 164 terminates in a conical nose 166. The angle of the conical nose corresponds to the angle of the conical abutment face 146. Further, the radius of the conical nose 166 at its widest point and smallest point is the same of the radius of the conical abutment surface 146 at its widest point and smallest point. Thus, full circular face-to-face contact between the conical nose 166 and the conical abutment surface 146 is assured for less than 180°.

The locator screw 160 is threaded into the locator screw hole 150 within the support member 104. When the locator screw 160 is turned in a first direction, the conical nose 166 moves into engagement with the conical face 146 on the stub member 124. Because the angle and radius of the conical face 146 is the same as the angle of the radius of the conical nose 166, full circular face-to-face contact between those parts for less than 180° is obtained. As a result, the tightening of the locator screw 160 against the conical face 146 of the tool holder 102 will cause the stub member 124 to automatically rotate to a predetermined radial position. At the same time, the conical nose 166 cooperates with the conical face 146 to seat the stub member 124 against the bottom of the bore 122. Once the stub member 124 is secured within the bore 122, the tool holder 102 can be inserted into the bore 122 and secured by pulling the locking rod 130 rearwardly.

From the foregoing, it is apparent that the present invention provides a mechanism for securing a tool holder or other tool part to a support member which gives accurate and repetitive radial location between the two parts. Further, the present invention provides positive axial locking.

The present invention may, of course, be carried out in other specific ways than those herein set forth without parting from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A tool holder assembly including a angular locator comprising:
   (a) a support member including an end face, a bore extending from the end face and adapted to receive a tool element, and a wall structure surrounding the bore;
   (b) a tool element including a forward portion extending outwardly from the support member and a generally cylindrical shank portion insertable into the bore of the support member;
   (c) means for angularly locating the tool with respect to the support member, the angular locating means including:
      (1) a locator screw hole extending through the wall structure surrounding the axial bore perpendicular to the centerline of the axial bore;
      (2) a conical abutment surface formed in the shank portion of the tool element, wherein the centerline of the conical abutment surface is coaxial with the centerline of the locator screw hole, and wherein the conical abutment surface forms a cone segment of not more than 180°; and
      (3) a locator screw threaded into the locator screw hole in the support member, the locator screw including a conical nose disposed coaxially with respect to the conical abutment surface and having a like configuration to said conical abutment surface so as to make surface contact with the conical abutment surface of the tool holder wherein when the locator screw is turned in a first direction, wherein the conical nose and conical abutment surface cooperate to angularly locate the tool holder with respect to the support member.

2. The tool holder assembly according to claim 1 wherein the locator screw hole includes a non-threaded section and wherein the locator screw includes a guide member insertable into the non-threaded section of the locator screw hole, the non-threaded section of the locator screw hole and guide member being closely fitted to one another to reduce slop between the locator screw hole and locator screw.

3. The tool assembly according to claim 1 wherein the tool element includes a recess formed therein and wherein the conical abutment surface is formed adjacent to the recess.

4. The tool assembly according to claim 3 wherein the recess extends circumferentially around the tool component.

5. A tool holder assembly comprising:
(a) a tool support member having a cylindrical bore formed therein;
(b) a tool element having a cylindrical shank which is insertable into the cylindrical bore of the tool support member;
(c) a recess formed in the cylindrical shank of the tool element, said recess including a conical abutment surface that forms a cone segment of not more than 180°;
(d) a locator screw hole formed in the tool support member, said locator screw hole being coaxial with the conical abutment surface on the shank of the tool element;
(e) a locator screw threaded into the locator screw hole of the tool support member, and including a conical nose disposed coaxially with respect to the conical abutment surface and having a like configuration to said conical abutment surface so as to make surface contact with the conical abutment surface of the tool element wherein when the locator screw is tightened against the shank of the tool element, the tool element is angularly located with respect to the tool support member and an axial force is applied to the tool element for seating the tool element against the tool support member.

6. The tool holder assembly according to claim 5 wherein the locator screw hole includes a non-threaded portion, and wherein the locator screw includes a non-threaded guide portion insertable into the non-threaded portion of the locator screw hole, the non-threaded portion of the locator screw hole and the guide portion being closely fitted to one another so as to reduce slop between the locator screw hole and locator screw.

7. The tool holder assembly according to claim 5 wherein the tool element has a flange adjacent its shank, which flange includes a shoulder extending perpendicularly to the axis of the shank, and wherein the tool support member includes an abutment surface surrounding the cylindrical bore for engagement with the shoulder of the tool element.

* * * * *